(12) United States Patent
Nagata et al.

(10) Patent No.: US 9,683,476 B2
(45) Date of Patent: Jun. 20, 2017

(54) EXHAUST GAS PURIFICATION DEVICE

(71) Applicant: FUTABA INDUSTRIAL CO., LTD., Aichi (JP)

(72) Inventors: Yoshinobu Nagata, Aichi (JP); Yasufumi Umeno, Aichi (JP)

(73) Assignee: FUTABA INDUSTRIAL CO., LTD., Aichi (JP)

( * ) Notice: Subject to any disclaimer, the term of this patent is extended or adjusted under 35 U.S.C. 154(b) by 0 days.

(21) Appl. No.: 14/654,366

(22) PCT Filed: Nov. 21, 2013

(86) PCT No.: PCT/JP2013/081400
§ 371 (c)(1),
(2) Date: Jun. 19, 2015

(87) PCT Pub. No.: WO2014/097815
PCT Pub. Date: Jun. 26, 2014

(65) Prior Publication Data
US 2015/0361852 A1 Dec. 17, 2015

(30) Foreign Application Priority Data

Dec. 21, 2012 (JP) .................................. 2012-279607

(51) Int. Cl.
*F01N 3/28* (2006.01)
*B01D 53/94* (2006.01)
*F01N 13/18* (2010.01)

(52) U.S. Cl.
CPC ........... *F01N 3/2892* (2013.01); *B01D 53/94* (2013.01); *F01N 13/18* (2013.01);
(Continued)

(58) Field of Classification Search
None
See application file for complete search history.

(56) References Cited

U.S. PATENT DOCUMENTS

2012/0260639 A1   10/2012   Bruck

FOREIGN PATENT DOCUMENTS

DE      2307215 A1 *   8/1974   ........... F01N 3/2853
DE     19518536 A1 *   7/1996   ............. F01N 3/021
(Continued)

OTHER PUBLICATIONS

Zacke et al. DE19518536A1—(1996)—translated document.*
Dipl-ing et al. DE2307215A1—(1974)—translated document.*
PCT IB 338 dated Jun. 25, 2015, for corresponding International Patent Application No. PCT/JP2013/081400, filed Nov. 21, 2013.
English translation of the International Preliminary Report on Patentability dated Jun. 21, 2015, for corresponding International Patent Application No. PCT/JP2013/081400, filed Nov. 21, 2013.
English translation of the Written Opinion dated Aug. 14, 2015, for corresponding International Patent Application No. PCT/JP2013/081400, filed Nov. 21, 2013.

(Continued)

*Primary Examiner* — Walter D Griffin
*Assistant Examiner* — Jelitza Perez
(74) *Attorney, Agent, or Firm* — David D. Brush; Westman Champlin & Koehler, P.A.

(57) ABSTRACT

An exhaust gas purification device comprises a catalyst disposed to the exhaust-gas flow path, and an inhibiting member that is disposed downstream of the catalyst in the exhaust-gas flow path, and diminishes a bias in flow-rate distribution of exhaust gases that flow into the catalyst by inhibiting a partial flow of the exhaust gases that flowed out of the catalyst, wherein the inhibiting member comprises a concave part comprising a concave shape facing the catalyst, and inhibits, by the concave part, a partial flow of the exhaust gases that flowed out of the catalyst.

8 Claims, 8 Drawing Sheets

(52) U.S. Cl.
CPC ...... *F01N 13/1872* (2013.01); *F01N 2240/20* (2013.01); *F01N 2260/14* (2013.01); *F01N 2470/02* (2013.01); *F01N 2490/08* (2013.01)

(56) References Cited

FOREIGN PATENT DOCUMENTS

| | | |
|---|---|---|
| DE | 102005022163 A1 | 11/2006 |
| FR | 2945576 A1 | 11/2010 |
| JP | S49113025 A | 10/1974 |
| JP | H06200754 A | 7/1994 |
| JP | H06060726 U | 8/1994 |
| JP | H11218019 A | 8/1999 |
| JP | 2001190646 A | 7/2001 |
| JP | 2002309931 A | 10/2002 |
| JP | 2005163621 A | 6/2005 |
| JP | 2007315246 A | 12/2007 |
| JP | 2008144644 A | 6/2008 |
| WO | 2007078441 A1 | 7/2007 |
| WO | 2011101896 A1 | 8/2011 |

OTHER PUBLICATIONS

International Preliminary Report on Patentability dated Aug. 28, 2014 for corresponding International Application No. PCT/JP2013/081400, filed Nov. 21, 2013.

International Search Report dated Dec. 11, 2013 for corresponding International Application No. PCT/JP2013/081400, filed Nov. 21, 2013.

Office Action dated Apr. 22, 2016 from the Canadian Intellectual Property Office for corresponding Canadian Application No. 2,895,938.

Extended European Search Report dated Jul. 28, 2016 from the European Partent Office for European Application No. 13865788.7.

English translation of the Japanese Office Action dated Sep. 20, 2016, for Japanese Application No. 2012-279607.

* cited by examiner

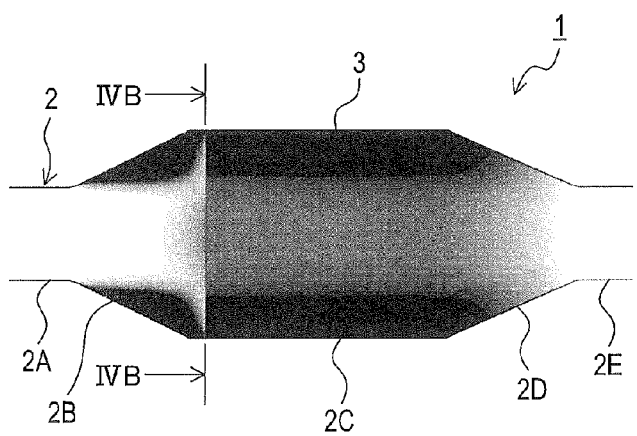
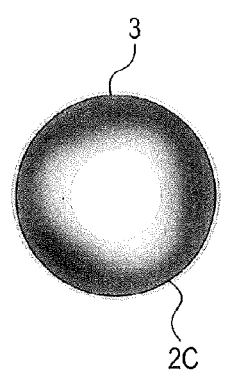
FIG.4A  　　　　　　　　　FIG.4B
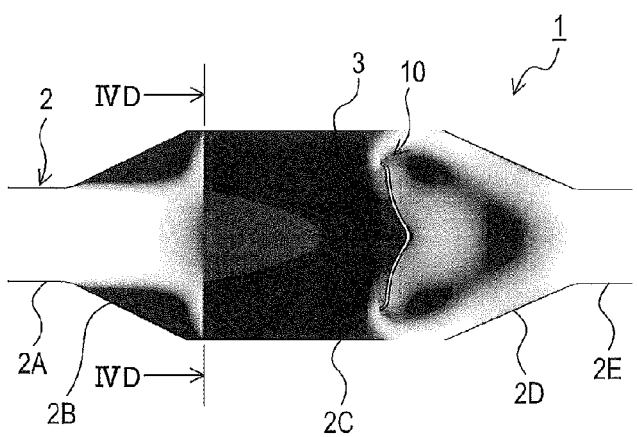
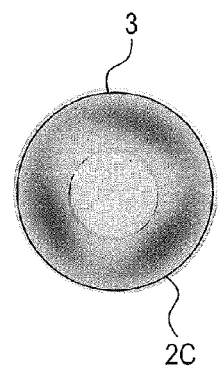
FIG.4C  　　　　　　　　　FIG.4D

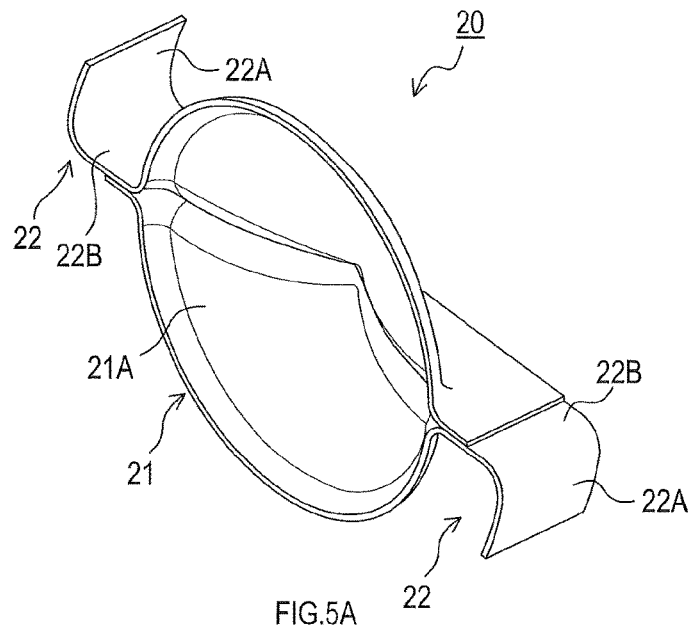
FIG.5A
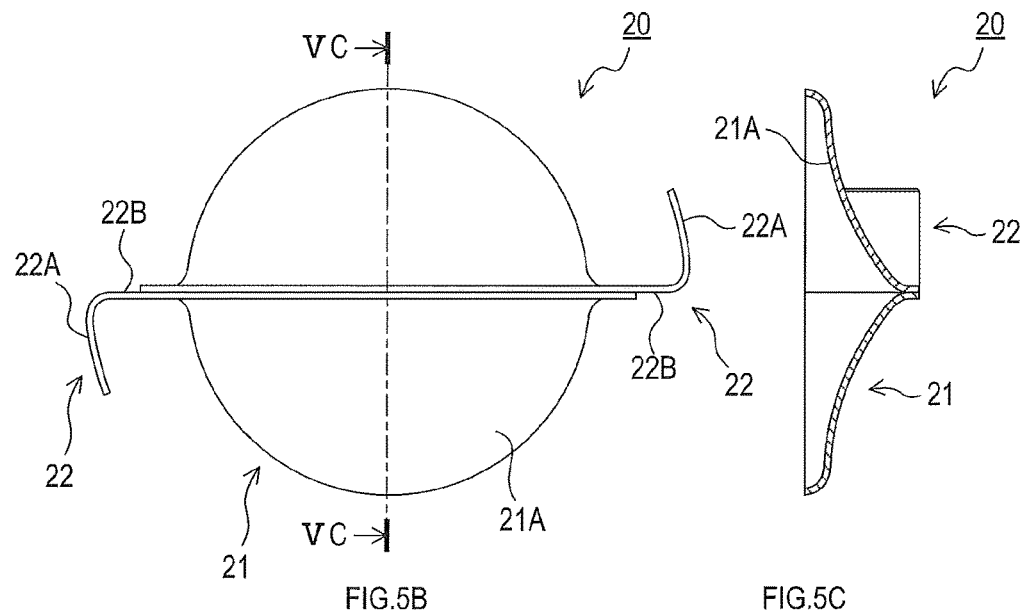
FIG.5B
FIG.5C

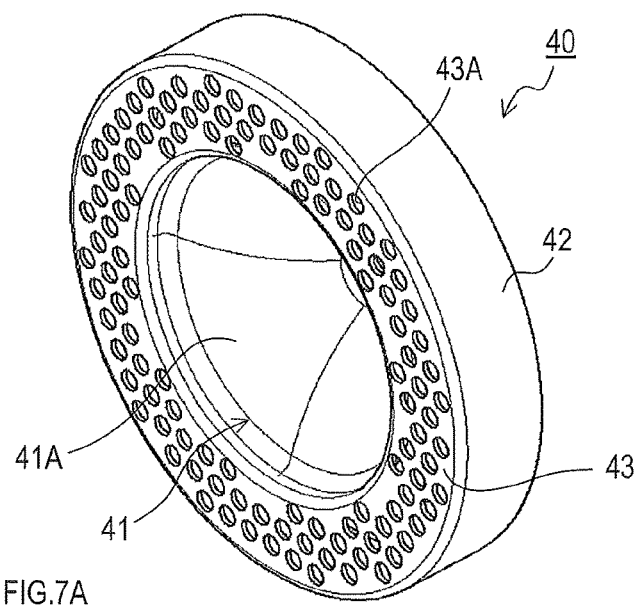
FIG.7A
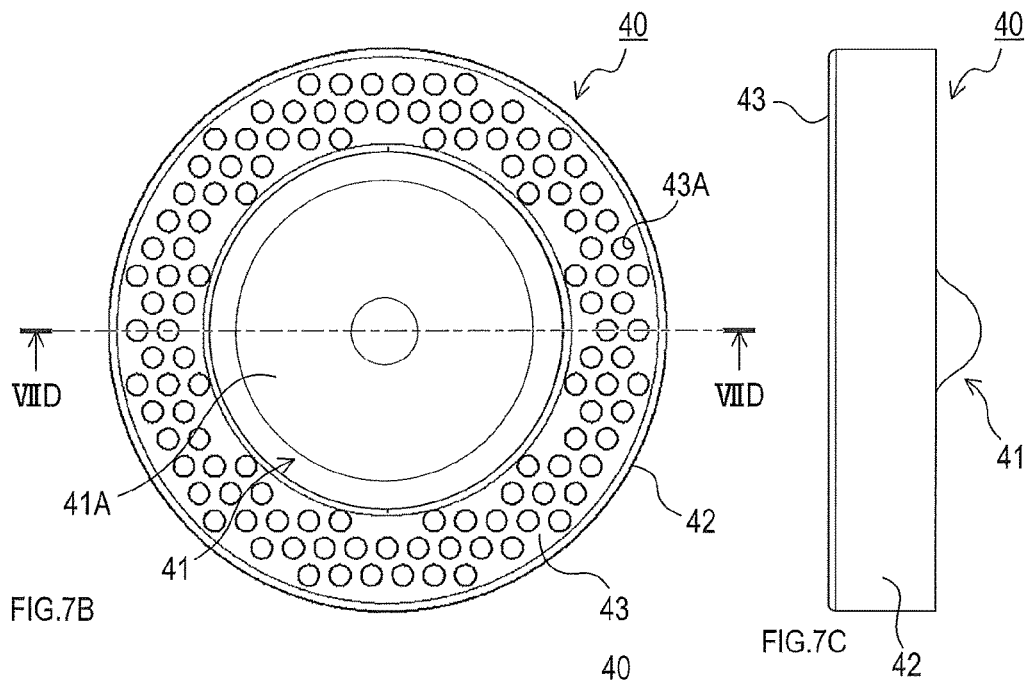
FIG.7B
FIG.7C
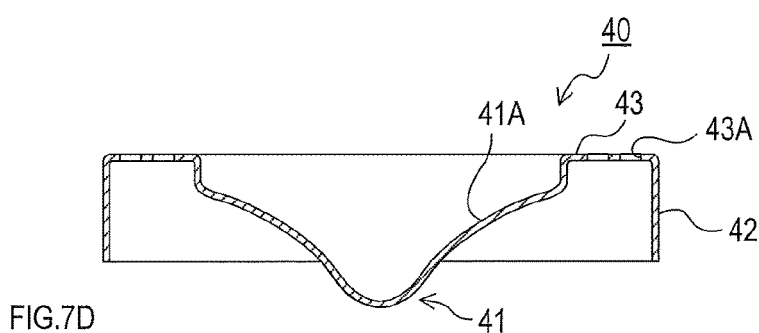
FIG.7D

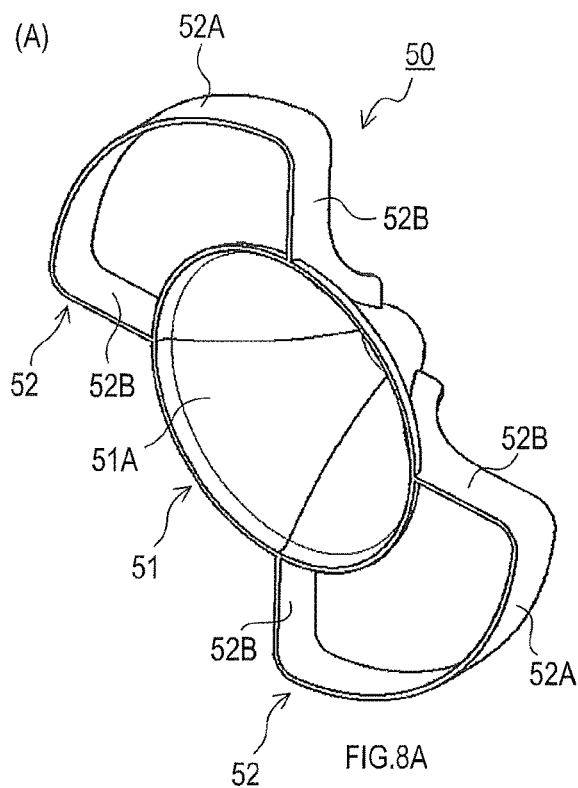
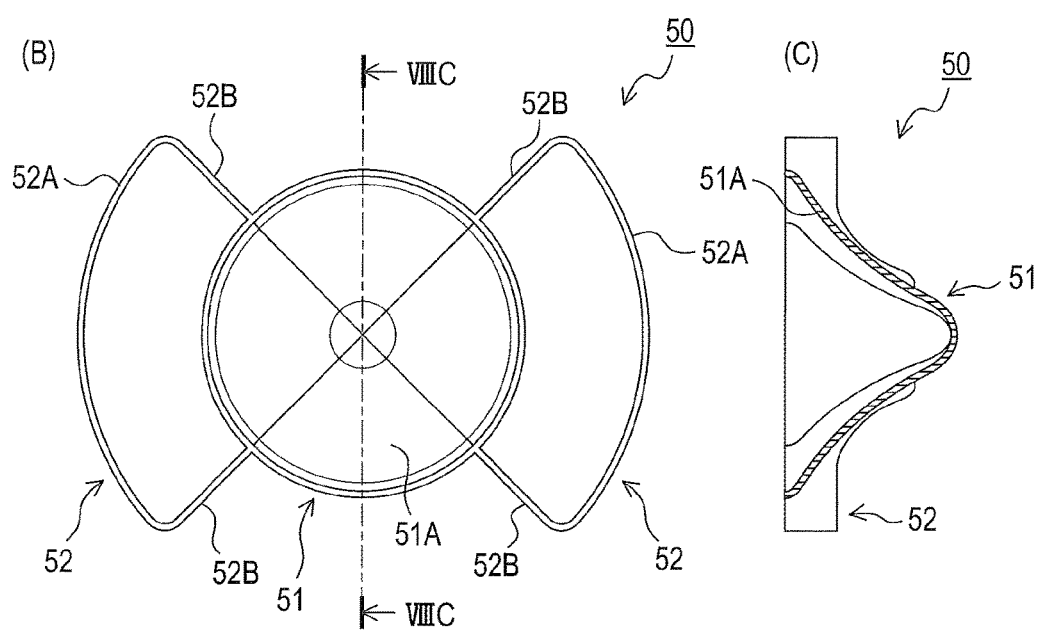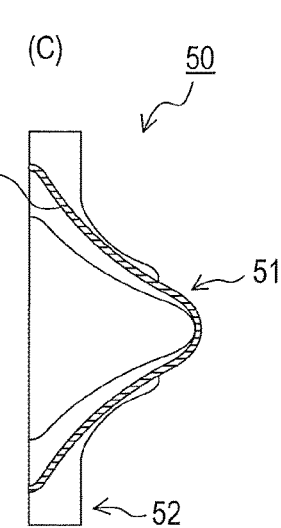
FIG.8A
FIG.8B
FIG.8C

EXHAUST GAS PURIFICATION DEVICE

CROSS-REFERENCE TO RELATED APPLICATIONS

This Application is a Section 371 National Stage Application of International Application No. PCT/JP2013/081400, filed Nov. 21, 2013, which is incorporated by reference in its entirety and published as WO 2014/097815A1 on Jun. 26, 2014, not in English, and claims the benefit of Japanese Patent Application No. 2012-279607, filed Dec. 21, 2012, in the Japan Patent Office, the entire disclosure thereof is incorporated herein by reference.

TECHNICAL FIELD

The present invention relates to an exhaust gas purification device that comprises a catalyst in an exhaust-gas flow path.

BACKGROUND ART

An exhaust gas purification device comprising a catalyst in an exhaust-gas flow path is known as a device to purify exhaust gases exhausted from an internal combustion engine. This type of exhaust gas purification device is usually provided with a catalyst having an outer diameter larger than the inner diameter of the exhaust-gas flow path in order to improve effect of exhaust gas purification by the catalyst. Thereby, a diameter-expansion flow path is disposed upstream of the catalyst to gradually expand the inner diameter of the exhaust-gas flow path.

However, in a structure comprising such a diameter-expansion flow path, a flow-rate of the exhaust gases in the diameter-expansion flow path is lower around the outer perimeter than in the central part, and thus a bias is caused in the flow-rate distribution of the exhaust gases that flow into the catalyst. Thus, a structure comprising a metal net body in the upstream side of the diameter-expansion flow path is suggested; the metal net body is for guiding the flow-rate distribution of the exhaust gases to uniformity (Patent Document 1).

PRIOR ART DOCUMENTS

Patent Documents

Patent Document 1: Unexamined Japanese Utility Model Application Publication No. H06-060726.

SUMMARY OF THE INVENTION

Problems to be Solved by the Invention

Nevertheless, in a structure where the metal net body is disposed upstream of the catalyst, the metal net body removes heat from the exhaust gases that flow into the catalyst. A decrease in temperature of the exhaust gases in such manner will cause a reduction in exhaust-gas purification effect by the catalyst.

In one aspect of the present invention, it is favorable to diminish the bias in the flow-rate distribution of the exhaust gases that flow into the catalyst while controlling a decrease in temperature of the exhaust gases that flow into the catalyst.

Means for Solving the Problems

An exhaust gas purification device in one aspect of the present invention comprises a catalyst disposed to an exhaust-gas flow path, and an inhibiting member that is disposed downstream of the catalyst in the exhaust-gas flow path and diminishes a bias in the flow-rate distribution of the exhaust gases that flow into the catalyst by inhibiting a partial flow of the exhaust gases that flowed out of the catalyst. The inhibiting member comprises a concave part having a concave shape facing the catalyst, and inhibits, by the concave part, a partial flow of the exhaust gases that flowed out of the catalyst.

In other words, in this structure, the bias in the flow-rate distribution of the exhaust gases that flow into the catalyst is diminished by the function of the inhibiting member disposed downstream of the catalyst. Thus, it is not necessary or less necessary to dispose upstream of the catalyst some member to diminish the bias in the flow-rate distribution of the exhaust gases that flow into the catalyst. Therefore, it is possible to diminish the bias in the flow-rate distribution of the exhaust gases that flow into the catalyst while controlling a decrease in temperature of the exhaust gases that flow into the catalyst.

In addition, the inhibiting member inhibits a partial flow of the exhaust gases that flowed out of the catalyst with the concave part; thus, it is possible to achieve an effect of inhibiting the flow while securing a distance between the catalyst and an impact position compared to a structure with a flat part for inhibiting the flow of the exhaust gases that flowed out of the catalyst. Therefore, the bias in the flow-rate distribution of the exhaust gases that flow into the catalyst can be diminished while controlling an increase in the pressure loss caused by disposing the inhibiting member.

In the above-mentioned structure, the concave part may be formed so as to become gradually smaller towards the downstream side of the exhaust-gas flow path. With such structure, a part of the exhaust gases that flowed out of the catalyst impacts the concave part and is smoothly guided outwards in radial direction. Therefore, the bias in the flow-rate distribution of the exhaust gases that flow into the catalyst can be diminished effectively while controlling an increase in the pressure loss caused by disposing the inhibiting member.

Aside from the above-mentioned exhaust gas purification device, the present invention can be achieved in various forms such as an inhibiting member provided in an exhaust gas purification device and a method for controlling a bias in flow-rate distribution of exhaust gases that flow into a catalyst.

BRIEF DESCRIPTION OF THE DRAWINGS

FIG. 4A is an illustration of a simulation result of a flow-rate distribution of exhaust gases in a comparison example as viewed from a side; FIG. 4B is an illustration of the simulation result of the flow-rate distribution of the exhaust gases in the comparison example as viewed from an end surface of a catalyst. FIG. 4C is an illustration of a simulation result of a flow-rate distribution of exhaust gases in the first embodiment as viewed from a side; FIG. 4D is an illustration of the simulation result of the flow-rate distribution of the exhaust gases in the first embodiment as viewed from an end surface of a catalyst.

FIG. 5A is a perspective view of an inhibiting member in the second embodiment as viewed from the catalyst side, and FIG. 5B is a rear view thereof. FIG. 5C is a VC-VC cross-sectional view of FIG. 5B.

FIG. 7A is a perspective view of an inhibiting member in the fourth embodiment as viewed from the catalyst side; FIG. 7B is a front view and FIG. 7C is a side view thereof. FIG. 7D is a VIID-VIID cross-sectional view of FIG. 7B.

FIG. 8A is a perspective view of an inhibiting member of a variation as viewed from the catalyst side; FIG. 8B is a front view thereof. FIG. 8C is a VIIIC-VIIIC cross-sectional view of FIG. 8B.

EXPLANATION OF REFERENCE NUMERALS

1 . . . exhaust gas purification device, 2 . . . flow-path member, 3 . . . catalyst, 10, 20, 30, 40, 50 . . . inhibiting member, 11, 21, 31, 41, 51 . . . shielding member, 11A, 21A, 31A, 41A, 51A . . . concave part.

MODE FOR CARRYING OUT THE INVENTION

Embodiments, in which the present invention is applied, are explained hereinafter with reference to the drawings.

[1. First Embodiment]

Figure 1:
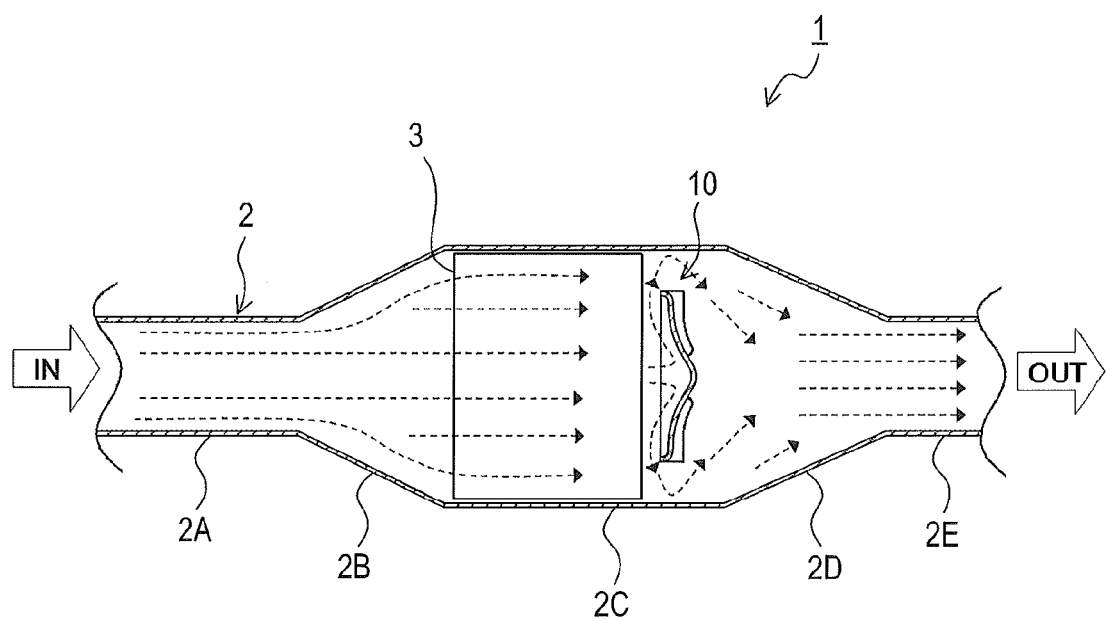
FIG. 1 is a cross-sectional view to show a structure of an exhaust gas purification device in the first embodiment.

An exhaust gas purification device 1 illustrated in FIG. 1 is to purify exhaust gases exhausted from an internal combustion engine (for example, a gasoline-engine) of an automobile. The exhaust gas purification device 1 comprises a flow-path member 2, a catalyst 3, and an inhibiting member 10.

The flow-path member 2 forms a part of an exhaust-gas flow path for guiding the exhaust gases exhausted from the internal combustion engine to the outside of the automobile; specifically, it forms an exhaust-gas flow path that lead to the catalyst 3. More specifically, the flow-path member 2 comprises a first tube-part 2A, a second tube-part 2B, a third tube-part 2C, a fourth tube-part 2D, and a fifth tube-part 2E in order from the upstream side of the exhaust-gas flow path (from the left in FIG. 1). The first tube-part 2A to the fifth tube-part 2E are sectioned for the convenience of explanation; sections of parts to form the flow-path member 2 are not particularly limited.

The first tube-part 2A is a straight round-tube part.

The third tube-part 2C is a straight round-tube part coaxial with the first tube-part 2A. Nevertheless, the inner diameter of the third tube-part 2C is made larger than that of the first tube-part 2A in order to accommodate the catalyst 3 that has a cylindrical shape with the outer diameter larger than the inner diameter of the first tube-part 2A. Thus, the first tube-part 2A is gently coupled to the third tube-part 2C with the second tube-part 2B; the second tube-part 2B is a truncated conical round-tube part forming a diameter-expansion flow path to gradually expand the inner diameter of the exhaust-gas flow path.

The fifth tube-part 2E is coaxial with the first tube-part 2A and the third tube-part 2C and is a straight round-tube part having the same inner diameter as the first tube-part 2A. In other words, the fifth tube-part 2E is formed so as to have an inner diameter smaller than that of the third tube-part 2C. Thus, the third tube-part 2C is coupled to the fifth tube-part 2E in a gentle slope with the fourth tube-part 2D; the fourth tube-part 2D is a truncated conical round-tube part forming a diameter-reduction flow path to gradually reduce the inner diameter of the exhaust-gas flow path.

That is to say that the flow-path member 2 forms the exhaust-gas flow path comprising the diameter-expansion flow path upstream of the catalyst 3 and the diameter-reduction flow path downstream of the catalyst 3.

The catalyst 3 is a known three-way catalyst that carries noble metals such as platinum, palladium, and rhodium on a ceramic carrier, for example, and purifies HC, CO, NOx and so forth in exhaust gases by an oxidation reaction or an oxidation-reduction reaction.

The inhibiting member 10 is for diminishing a bias in the flow-rate distribution of the exhaust gases that flow into the catalyst 3, in other words, it is for guiding the flow-rate distribution to uniformity. The inhibiting member 10 is disposed downstream of the catalyst 3 in the exhaust-gas flow path.

Figure 2A:
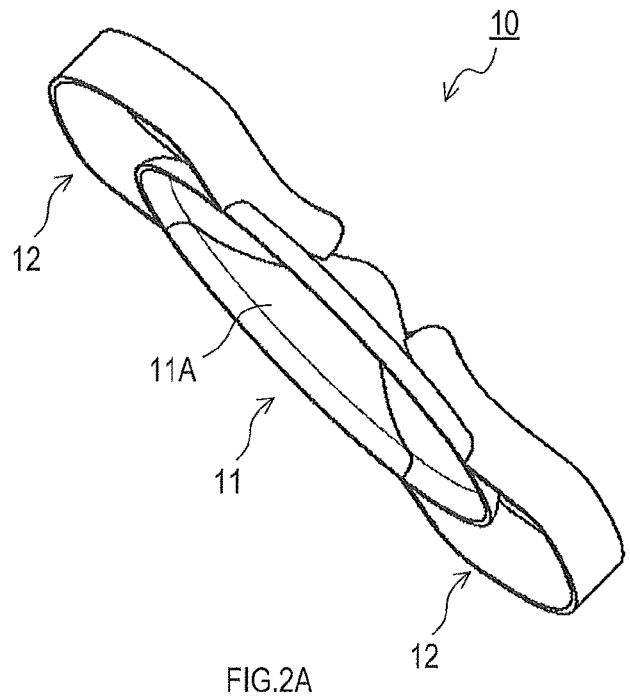
FIG. 2A is a perspective view of an inhibiting member in the first embodiment as viewed approximately from a side.
Figures 2B, 2C:
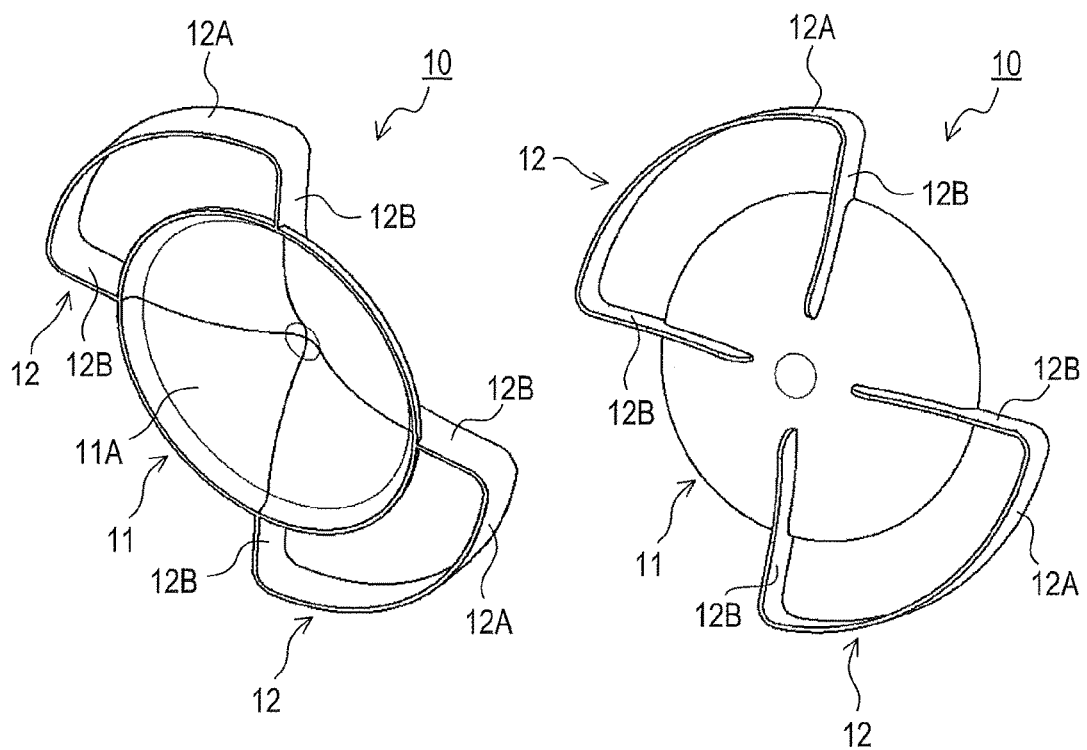
FIG. 2B is a perspective view of the inhibiting member as viewed from the catalyst side.
FIG. 2C is a perspective view of the inhibiting member as viewed from the side opposite the catalyst side.
Figures 3A, 3B:
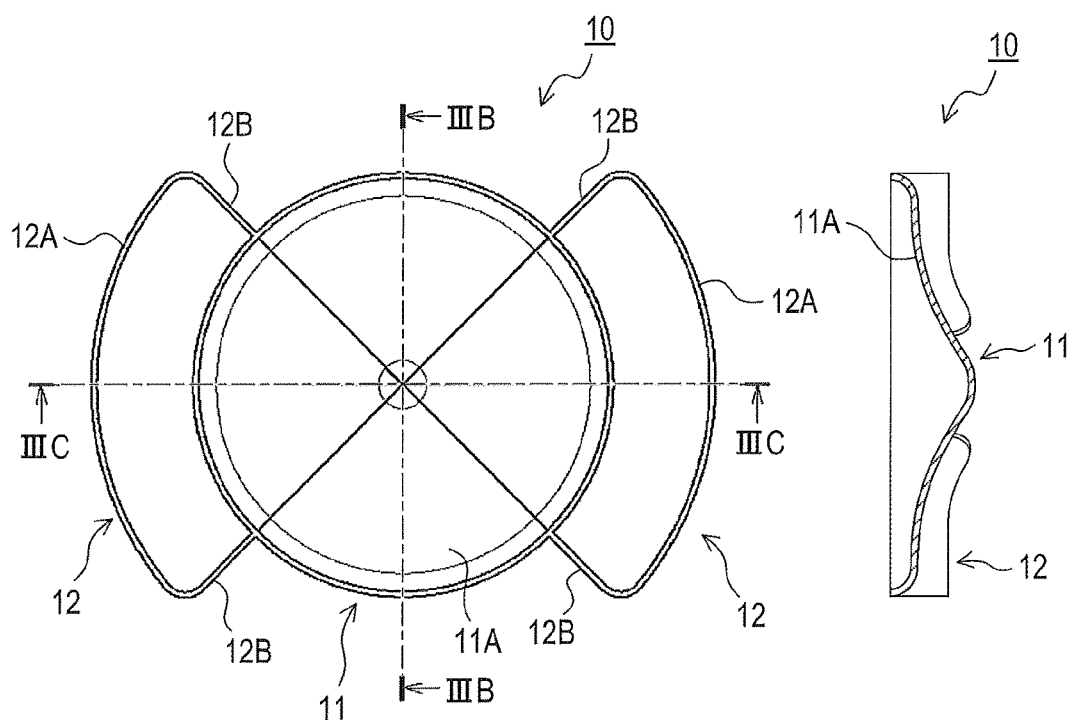
FIG. 3A is a front view of the inhibiting member in the first embodiment.
FIG. 3B is a IIIB-IIIB cross-sectional view of FIG. 3A.
Figure 3C:
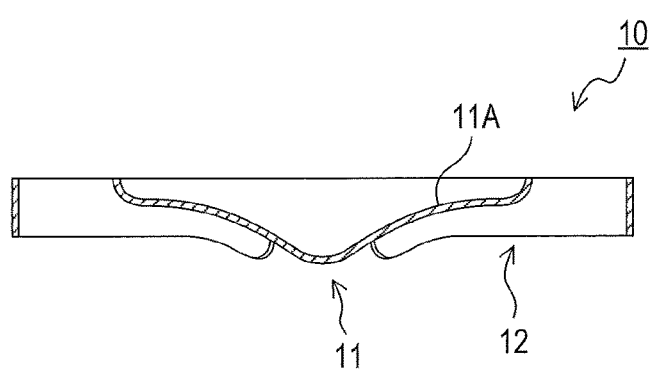
FIG. 3C is a IIIC-IIIC cross-sectional view of FIG. 3A.

Here is a specific structure of the inhibiting member 10 explained with reference to FIG. 2A to FIG. 2C and FIG. 3A to FIG. 3C. Note that FIG. 2A is a perspective view of the inhibiting member 10 viewed approximately from the side (from a direction nearly orthogonal to the axial direction of the exhaust-gas flow path); FIG. 2B is a perspective view of the inhibiting member 10 viewed from the catalyst 3 side (from the upstream side of the exhaust-gas flow path); and, FIG. 2C is a perspective view of the inhibiting member 10 viewed from the side opposite the catalyst 3 side (from the downstream side of the exhaust-gas flow path). In addition, FIG. 3A is an illustration of the inhibiting member 10 viewed from the axial direction from the upstream side of the exhaust-gas flow path (the front view); FIG. 3B is a IIIB-IIIB cross-sectional view of FIG. 3A; and, FIG. 3C is a IIIC-IIIC cross-sectional view of FIG. 3A.

The inhibiting member 10 comprises a shielding member 11 and two arms 12.

The shielding member 11 is an umbrella-shaped circular part having a surface facing the catalyst 3 (left side surface in FIG. 3B, or top side surface in FIG. 3C) formed into an approximately conical concave shape, in other words, formed to comprise a concave part 11A. More specifically, the concave part 11A in the present embodiment is slightly curved inward compared to a curved surface of a right cone and has a part corresponding to the vertex of a cone rounded.

Two arms 12 are belt-like plate parts curved into C-shape as illustrated in FIG. 2B and FIG. 2C and each comprises a fixed part 12A and two connecting parts 12B.

The fixed part 12A is formed into an arc of a circle that is one size larger than the outer edge of the shielding member 11 as illustrated in FIG. 3A. In particular, the fixed part 12A is designed into an arc of a circle that has an outer diameter corresponding to the inner diameter of the third tube-part 2C (for example, in a size equal to or slightly smaller than the inner diameter of the third tube-part 2C) and is fixed to the inner surface of the third tube-part 2C by welding and so forth.

The connecting parts 12B are parts extended from each end of the fixed parts 12A in a radial direction and couples the shielding member 11 and the fixed parts 12A so as to locate the shielding member 11 at the center of the inhibiting member 10 as illustrated in FIG. 3A. In other words, the shielding member 11 is fixed with four connecting parts 12B so as to be located near the center of a cross section that is orthogonal to the axial direction of the exhaust-gas flow path (i.e., so that the third tube-part 2C and the shielding member 11 are on the same axis). In this example, four connecting parts 12B are arranged on the shielding member 11 in a circumferential direction at equal intervals (i.e., at every 90 degrees). In relation to the catalyst 3, the shielding member 11 is spaced apart from a flow-out surface (the end surface in the downstream) of the catalyst 3, and is disposed to a position where the exhaust gases that flowed out of the central part of the flow-out surface impact the shielding member 11. The space between the flow-out surface of the catalyst 3 and the shielding member 11 is preferably wide enough so as not to block the flow of the exhaust gases completely and also close enough so as not to let the flow pass through easily.

The shielding member 11 and the arms 12 that form the inhibiting member 10, more specifically, the fixed part 12A and the connecting parts 12B that form the arm 12 are sectioned for the convenience of explanation; sections of parts to form the inhibiting member 10 are not particularly limited. For example, the inhibiting member 10 may be produced by forming a shielding member 11 by pressing a metal plate material, forming two arms 12 by bending another two metal plate materials, and joining these parts by welding.

Simulation results will be explained next. FIG. 4A and FIG. 4B illustrate a simulation result of an exhaust gas purification device in a comparison example that does not comprise an inhibiting member 10. On the other hand, FIG. 4C and FIG. 4D illustrate a simulation result of the exhaust gas purification device 1 in the present embodiment. In FIG. 4A to FIG. 4D, flow-rate distributions of the exhaust gases are expressed by color density; a light-colored part represents a high flow-rate of the exhaust gases. In addition, FIG. 4B corresponds to a IVB-IVB cross-sectional view of FIG. 4A, and FIG. 4D corresponds to a IVD-IVD cross-sectional view of FIG. 4C.

In the diameter-expansion flow path, the flow-rate around the outer perimeter tends to be low compared to the flow-rate in the central part, which is on an extension line from the exhaust-gas flow path created by the first tube-part 2A. Thus, the flow-rate distribution of the exhaust gases that flow into the catalyst 3 is biased towards the central part in the exhaust gas purification device in the comparison example as illustrated in FIG. 4A and FIG. 4B. On the contrary, in the exhaust gas purification device 1 in the present embodiment, the flow of the exhaust gases that flowed out of the central part of the flow-out surface of the catalyst 3 is inhibited by the inhibiting member 10 as illustrated in FIG. 4C and FIG. 4D. As a consequence, it appears that the flow of the exhaust gases into the central part of the flow-in surface (the end surface in the upstream) of the catalyst 3 is controlled and the bias in the flow-rate distribution of the exhaust gases that flow into the catalyst 3 is diminished.

The above-described first embodiment can provide the following effects.

[A1] The inhibiting member 10 disposed downstream of the catalyst 3 in the exhaust-gas flow path inhibits a partial flow of the exhaust gases that flowed out of the catalyst 3 and causes to diminish the bias in the flow-rate distribution of the exhaust gases that flow into the catalyst 3. In particular, since the shielding member 11 is disposed to a position where the exhaust gases that flowed out of the central part of the flow-out surface of the catalyst 3 impact the shielding member 11, the flow of the exhaust gases that flowed out of the central part of the flow-out surface of the catalyst 3 is inhibited (generates friction). The exhaust gases stagnate longer before entering the catalyst 3 by thus inhibiting the flow of the exhaust gases that flow through the central part of the catalyst 3, and the flow around the outer perimeter, where the gas flow was low, is accelerated. As a consequence, the flow of the exhaust gases into the central part of the flow-in surface of the catalyst 3 is relatively controlled, and the bias in the flow-rate distribution of the exhaust gases that flow into the catalyst 3 is diminished (uniformity is improved).

That is to say that, with the above structure, the bias in the flow-rate distribution of the exhaust gases that flow into the catalyst 3 is diminished by the function of the inhibiting member 10 disposed downstream of the catalyst 3. Thus, it is not necessary to dispose upstream of the catalyst 3 some member to diminish the bias in the flow-rate distribution of the exhaust gases that flow into the catalyst 3. Therefore, it is possible to diminish the bias in the flow-rate distribution of the exhaust gases that flow into the catalyst 3 while controlling a decrease in temperature of the exhaust gases that flow into the catalyst 3. In addition, since an existing space (the diameter-reduction flow path) formed downstream of the catalyst 3 is used for disposing the inhibiting member 10, a new space that should be secured for disposing the inhibiting member 10 can be reduced or eliminated.

[A2] The entire catalyst 3 is efficiently (effectively) used by diminishing the bias in the flow-rate distribution of the exhaust gases that flow into the catalyst 3; thus, the length of the catalyst 3 in the axial direction can be shortened, for example. Thus, in the present embodiment, it is possible to reduce pressure loss caused by passing through the catalyst 3, and moreover, to reduce the cost of the catalyst 3 itself by reducing the necessary amount of the noble metals.

[A3] It is possible to shorten the length (steepen the angle to expand the inner diameter of the exhaust-gas flow path) of the diameter-expansion flow path (the second tube-part 2B) in the upstream of the catalyst 3 by diminishing the bias in the flow-rate distribution of the exhaust gases that flow into the catalyst 3. By thus shortening the length of the diameter-expansion flow path, the position of the catalyst 3 can be moved closer to the internal combustion engine accordingly. Thus, in the present embodiment, it is possible to control a decrease in temperature of the exhaust gases that flow into the catalyst 3 and to improve reducing ability of the catalyst 3.

[A4] The inhibiting member 10 comprises the concave part 11A having a concave shape facing the catalyst 3, and inhibits by the concave part 11A a partial flow of the exhaust gases that flowed out of the catalyst 3, in particular a flow of the exhaust gases that flowed out of the central part of the flow-out surface of the catalyst 3. Consequently, a distance between the catalyst 3 and the impact position is secured while yielding an effect of inhibiting the flow compared to a structure to use a flat part for inhibiting the flow of the exhaust gases that flowed out of the catalyst 3. Thus, in the present embodiment, it is possible to diminish the bias in the flow-rate distribution of the exhaust gases that flow into the catalyst 3 while controlling an increase in the pressure loss caused by disposing the inhibiting member 10.

[A5] The concave part 11A has a circular shape as viewed from the catalyst 3, and the diameter of the circular shape, in other words, the size of the concave shaped area (the cross section area), gradually decreases towards the downstream side of the exhaust-gas flow path. That is to say that the concave part 11A is formed approximately conical. Thus, a part of the exhaust gases that flowed out of the catalyst 3 impacts the concave part 11A and is guided outwards in the radial direction. This phenomenon is similar to the situation observed when water is kept poured into the center of an approximately conical container and overflows from the container. The exhaust gases that flowed out from the area near the central part of the flow-out surface of the catalyst 3 impacts the shielding member 11 or the exhaust gases that overflow from the shielding member 11. Meanwhile, the exhaust gases that flowed out from the area near the outer perimeter of the flow-out surface of the catalyst 3 pass by the shielding member 11 from outside. Consequently, compared to a structure comprising no inhibiting member 10, the amount of the exhaust gases that flow into the area near the central part of the flow-in surface of the catalyst 3 is reduced. Thus, in the present embodiment, it is possible to effectively diminish the bias in the flow-rate distribution of the exhaust gases that flow into the catalyst 3, while controlling the increase in the pressure loss caused by disposing the inhibiting member 10.

[2. Second Embodiment]

The basic structure in the second embodiment is the same as the first embodiment; the difference is that an inhibiting member 20 illustrated in FIG. 5A to FIG. 5C is used as a substitute for the above-mentioned inhibiting member 10. Other structures in common with the first embodiment will be described using the same reference numerals, and explanations of such structures will be omitted. FIG. 5A is a perspective view of the inhibiting member 20 as viewed from the catalyst 3 side (the upstream side of the exhaust-gas flow path). FIG. 5B is an illustration of the inhibiting member 20 as viewed from the axial direction from the downstream side of the exhaust-gas flow path (the rear view); FIG. 5C is a VC-VC cross-sectional view of FIG. 5B.

The inhibiting member 20 in the second embodiment comprises a shielding member 21 and two arms 22.

The shielding member 21 is an umbrella-shaped circular part having a surface facing the catalyst 3 (the left side surface in FIG. 5C) formed into an approximately conical concave shape, in other words, the shielding member 21 is formed to comprise a concave part 21A. More specifically, the concave part 21A in the second embodiment is slightly curved inward compared to the curved surface of a right cone, as in the first embodiment.

The two arms 22 are belt-like plate parts bent into L-shape as illustrated in FIG. 5A and each comprise a fixed part 22A and a connecting part 22B.

The fixed part 22A is formed into an arc of a circle that is one size larger than the outer edge of the shielding member 21 as illustrated in FIG. 5B. More specifically, the fixed part 22A is designed into an arc of a circle that has an outer diameter corresponding to the inner diameter of the third tube-part 2C and is fixed to the inner surface of the third tube-part 2C by welding and so forth.

The connecting part 22B is a part extended from one end of the fixed part 22A in a radial direction and couples the shielding member 21 and the fixed part 22A so as to locate the shielding member 21 at the center of the inhibiting member 20 as illustrated in FIG. 5B. In other words, the shielding member 21 is fixed with two connecting parts 22B so as to be located near the center of a cross section that is orthogonal to the axial direction of the exhaust-gas flow path (i.e., so that the third tube-part 2C and the shielding member 21 are on the same axis). In this example, two connecting parts 22B are arranged on the shielding member 21 in a circumferential direction at equal intervals (i.e., at an interval of 180 degrees). In relation to the catalyst 3, the shielding member 21 is spaced apart from the flow-out surface (the end surface in the downstream side) of the catalyst 3 and is disposed to a position where the exhaust gases that flowed out of the central part of the flow-out surface impact the shielding member 21.

The shielding member 21 and the arm 22 that form the inhibiting member 20, more specifically, the fixed part 22A and the connecting part 22B that form the arm 22 are sectioned for the convenience of explanation; sections of parts to form the inhibiting member 20 are not particularly limited. For example, the inhibiting member 20 may be produced by forming a half of the shielding member 21 (half a sphere) and one arm 22 by pressing and bending a metal plate material, and joining two of this parts by welding.

The above-described second embodiment can provide the same effects as the first embodiment.

[3. Third Embodiment]

Figure 6A:
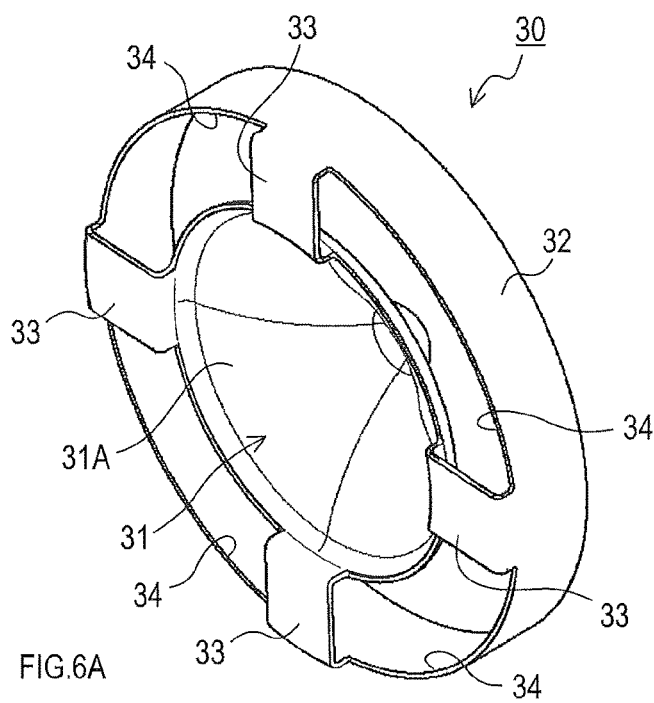
FIG. 6A is a perspective view of an inhibiting member in the third embodiment as viewed from the catalyst side.
Figure 6B:
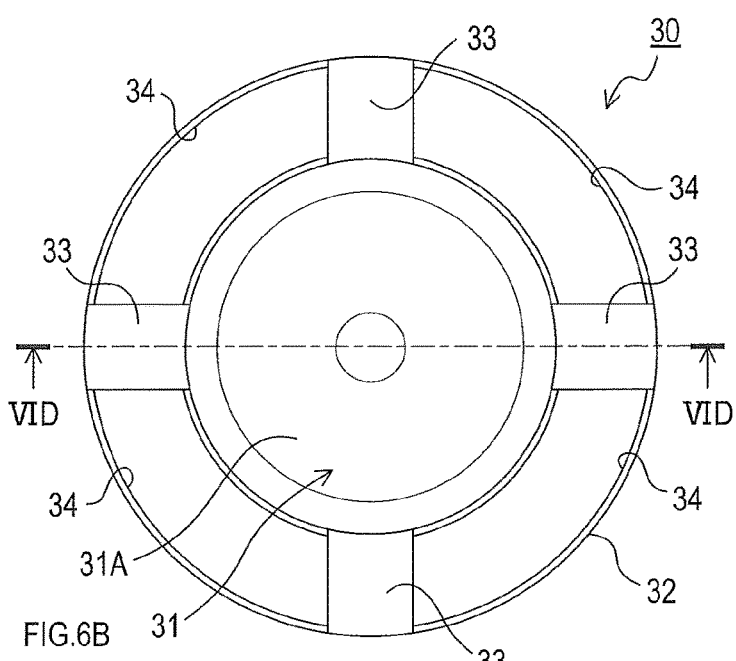
FIG. 6B is a front view and FIG. 6C is a side view thereof.
Figure 6C:
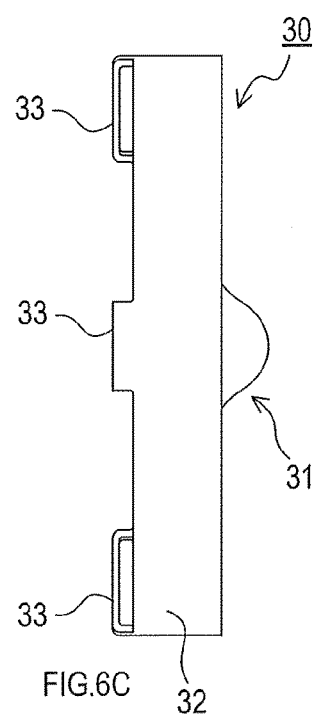
Figure 6D:
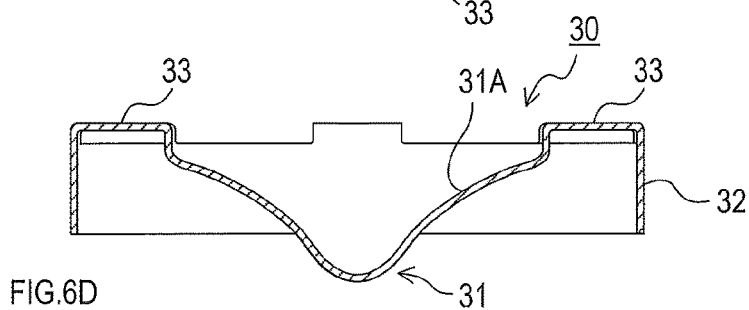
FIG. 6D is a VID-VID cross-sectional view of FIG. 6B.

The basic structure in the third embodiment is the same as the first embodiment; the difference is that an inhibiting member 30 illustrated in FIG. 6A to FIG. 6D is used as a substitute for the above-mentioned inhibiting member 10. Other structures in common with the first embodiment will be described using the same reference numerals, and explanations of such structures will be omitted. FIG. 6A is a perspective view of the inhibiting member 30 as viewed from the catalyst 3 side (the upstream side of the exhaust-gas flow path). FIG. 6B is an illustration of the inhibiting member 30 as viewed from the axial direction from the upstream side of the exhaust-gas flow path (the front view). FIG. 6C is an illustration of the inhibiting member 30 as viewed from a side (from a direction orthogonal to the axial direction of the exhaust-gas flow path) (the side view). FIG. 6D is a VID-VID cross-sectional view of FIG. 6B.

The inhibiting member 30 in the third embodiment comprises a shielding member 31, a fixed part 32, and four connecting parts 33.

The shielding member 31 is an umbrella-shaped circular part having a surface facing the catalyst 3 (the top side surface in FIG. 6D) formed into an approximately conical concave shape, in other words, the shielding member 31 is formed to comprise a concave part 31A. More specifically, as in the first embodiment, the concave part 31A in the third embodiment is slightly curved inward compared to the curved surface of a right cone and has a part corresponding to the vertex of a cone rounded.

The fixed part 32 is formed into a cylinder of a circle that is one size larger than the outer edge of the shielding member 31 as illustrated in FIG. 6B. In particular, the fixed part 32 is designed into a cylinder that has an outer diameter corresponding to the inner diameter of the third tube-part 2C and is fixed to the inner surface of the third tube-part 2C by welding and so forth.

The connecting part 33 is a part extended from the fixed part 32 in a radial direction and couples the shielding member 31 and the fixed part 32 so as to locate the shielding member 31 at the center of the inhibiting member 30 as illustrated in FIG. 6B. In other words, the shielding member 31 is fixed with four connecting parts 33 so as to be located near the center of a cross section that is orthogonal to the axial direction of the exhaust-gas flow path (i.e., so that the third tube-part 2C and the shielding member 31 are on the same axis). In this example, four connecting parts 33 are arranged on the shielding member 31 in a circumferential direction at equal intervals (i.e., at every 90 degrees). In relation to the catalyst 31, the shielding member 31 is spaced apart from the flow-out surface of the catalyst 3 (the end surface in the downstream side) and is disposed to a position where the exhaust gases that flowed out of the central part of the flow-out surface impact the shielding member 31.

Meanwhile, on the outer perimeter of the shielding member 11, a portion where the connecting part 33 is not provided functions as a pass-through 34 for letting the exhaust gases pass through.

The shielding member 31, the fixed part 32 and the connecting part 33 that form the inhibiting member 30 are sectioned for the convenience of explanation; sections of parts to form the inhibiting member 30 are not particularly limited.

The above-described third embodiment can provide the same effects as the first embodiment.

[4. Fourth Embodiment]

The basic structure in the fourth embodiment is the same as the first embodiment; the difference is that an inhibiting member 40 illustrated in FIG. 7A to FIG. 7D is used as a substitute for the above-mentioned inhibiting member 10. Other structures in common with the first embodiment will be described using the same reference numerals, and explanations of such structures will be omitted. FIG. 7A is a perspective view of the inhibiting member 40 as viewed from the catalyst 3 side (the upstream side of the exhaust-gas flow path). FIG. 7B is an illustration of the inhibiting member 40 as viewed from the axial direction from the upstream side of the exhaust-gas flow path (the front view). FIG. 7C is an illustration of the inhibiting member 40 as viewed from a side (from a direction orthogonal to the axial direction of the exhaust-gas flow path) (the side view). FIG. 7D is a VIID-VIID cross-sectional view of FIG. 7B.

The inhibiting member 40 in the fourth embodiment comprises a shielding member 41, a fixed part 42, and a connecting part 43. The shapes of the shielding member 41 (concave part 41A) and the fixed part 42 are the same as the shapes of the shielding member 31 (concave part 31A) and the fixed part 32 in the third embodiment; thus, explanations will be omitted.

The connecting part 43 is a ring-shaped surface for coupling the shielding member 41 and the fixed part 42 and perforated with numerous through holes 43A. In other words, the exhaust gases pass through the through holes 43A in the fourth embodiment in contrast to the above-mentioned third embodiment where the exhaust gases pass through the outer perimeter of the shielding member 11 from the portion where the connecting part 43 is not provided.

The shielding member 41, the fixed part 42, and the connecting part 43 that form the inhibiting member 40 are sectioned for the convenience of explanation; sections of parts to form the inhibiting member 40 are not particularly limited.

The above-described fourth embodiment can provide the same effects as the first embodiment.

[5. Other Embodiments]

The embodiments of the present invention are hereinbefore explained; nevertheless, it goes without saying that the present invention can be carried out in various modes without being limited to the above-mentioned embodiments.

[B1] The shapes of the shielding member illustrated in the above-mentioned embodiments are only examples; the outer diameter of the shielding member (i.e., ratio of the portion of the shielding member to the portion of the pass-through in the exhaust-gas flow path), the depth of the concave part, and such may be changed appropriately. For example, as illustrated in FIG. 8A to FIG. 8C, a concave part 51A of an inhibiting member 50 may be formed deeper than the inhibiting member 10 in the first embodiment. The above-mentioned embodiments illustrate concave parts that are curved inward compared to the curved surface of a right cone; nevertheless, a concave part may be, for example, curved outward compared to the curved surface of a right cone, or having the curved surface of a right cone. A shape of the concave part may be other than an approximately conical shape, or it may be a shape without a concave part, for example, a plane surface. For example, a perforated plate (flat plate perforated with numerous through holes) having a larger pass-through ratio on the outer perimeter than in the central part may be used.

[B2] The above-mentioned embodiments illustrate a structure where the shielding member (concave part) is disposed to a position where the exhaust gases that flowed out of the central part of the flow-out surface of the catalyst 3 impact the shielding member, on the assumption that the flow-rate distribution of the exhaust gases that flow into the catalyst 3 is biased towards the central part; nevertheless, the above-mentioned embodiments are not limited thereto. For example, if the flow-rate distribution of the exhaust gases that flow into the catalyst 3 is biased in some part other than the central part, the shielding member (concave part) may be disposed to the biased part (a position with a high exhaust-gas flow rate). Although the position of the shielding member is different, parts other than the connecting part (the shielding member and the fixed part) can share the same designs.

[B3] The above-mentioned embodiments illustrate a structure where a member for diminishing the bias in the flow-rate distribution of the exhaust gases that flow into the catalyst 3 is not disposed upstream of the catalyst 3; nevertheless, the above-mentioned embodiments are not limited thereto and may comprise some member disposed upstream of the catalyst 3. The member disposed upstream can be simplified through the effect of the inhibiting member disposed downstream of the catalyst 3, and the same results as the above-mentioned embodiments can be attained in this case as well.

[B4] The exhaust-gas flow paths in the above-mentioned embodiments are thoroughly examples and an exhaust-gas flow path is not limited thereto. For example, the inner diameter of the first tube-part 2A and the fifth tube-part 2E may be different; the first tube-part 2A to the fifth tube-part 2E are not necessarily on the same axis; and, a cross section thereof does not necessarily have a circular shape. The diameter-expansion flow path and the diameter-reduction flow path may be in a shape other than a truncated conical shape. The exhaust-gas flow path is not limited to comprise a diameter-expansion flow path; an application of the present invention can be effective even with an exhaust-gas flow path that does not comprise a diameter-expansion flow path, since the flow-rate distribution of the exhaust gases that flow into the catalyst may be biased depending on the structure upstream of the catalyst. In addition, although a straight exhaust-gas flow path is assumed in the above-mentioned embodiments, it is not limited thereto; the present invention may be applied to an exhaust-gas flow path comprising a curved flow path.

[B5] Although the above-mentioned embodiments illustrate a three-way catalyst as the catalyst 3, the above-mentioned embodiments are not limited thereto; the present invention may be applied to a catalyst other than the three-way catalyst.

[B6] Each component in the present invention is conceptual and not limited to the above-mentioned embodiments. For example, a function of one component may be distributed to more than one component, or functions of more than one component may be gathered into one component. In addition, at least one of the structures in the above-mentioned embodiments may be replaced with a known structure that has the same or similar function.

The invention claimed is:

1. An exhaust gas purification device comprising;
   a catalyst disposed to an exhaust-gas flow path in a flow path member;
   an inhibiting member that is disposed in the exhaust-gas flow path, and diminishes a bias in flow-rate distribution of the exhaust gases that flow into the catalyst by inhibiting a partial flow of the exhaust gases, wherein the inhibiting member is disposed only downstream of the catalyst and comprises a container-shaped concave part having a bottom surface closed to gas flow; and
   a supporting part that supports the inhibiting member in a predetermined position so that the inhibiting member faces the catalyst, the supporting part comprising:
      a fixed part that is fixed to the flow path member; and
      a connecting part that couples the concave part and the fixed part, wherein the connecting part extends radially outward from the concave part parallel to a downstream end-surface of the catalyst,
   wherein the supporting part supports the inhibiting member in a position so that the concave part faces a part of the downstream end-surface of the catalyst.

2. The exhaust gas purification device according to claim 1,
   wherein the concave part is formed so as to become gradually smaller towards a downstream side of the exhaust-gas flow path.

3. The exhaust gas purification device according to claim 1,
   wherein the inhibiting member comprises a rim formed around a periphery of the concave part, which is connected to the connecting part, the rim being bent to protrude towards the catalyst.

4. The exhaust gas purification device according to claim 1,
   wherein a periphery of a surface that forms the concave part comprises a rising surface, the rising surface having a small angle compared to other areas of the surface in relation to a straight line along a central axis of the catalyst.

5. The exhaust gas purification device according to claim 1,
   wherein the connecting part is formed so that an area connected to the fixed part does not protrude towards the catalyst further than an area connected to the inhibiting member.

6. The exhaust gas purification device according to claim 5,
   wherein the fixed part is formed so as not to protrude towards the catalyst further than the connecting part.

7. The exhaust gas purification device according to claim 1,
   wherein the concave part is disposed so as to face an area off the center of the downstream end-surface of the catalyst.

8. The exhaust gas purification device according to claim 1,
   wherein the inhibiting member is provided separately from the flow path member forming the exhaust-gas flow path.

* * * * *